United States Patent
Figura et al.

(10) Patent No.: US 9,914,471 B2
(45) Date of Patent: Mar. 13, 2018

(54) SECURING ARRANGEMENT FOR A STEERING GEAR HOUSING

(71) Applicant: FORD GLOBAL TECHNOLOGIES, LLC, Dearborn, MI (US)

(72) Inventors: Michael Georg Figura, Dormagen (DE); Hubertus von Chappuis, Bedburg (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 181 days.

(21) Appl. No.: 14/838,595

(22) Filed: Aug. 28, 2015

(65) Prior Publication Data

US 2016/0059882 A1 Mar. 3, 2016

(30) Foreign Application Priority Data

Aug. 29, 2014 (DE) .......................... 10 2014 217 317

(51) Int. Cl.
*B62D 7/18* (2006.01)
*B62D 3/12* (2006.01)

(52) U.S. Cl.
CPC ...................................... *B62D 3/12* (2013.01)

(58) Field of Classification Search
CPC ....................................................... B62D 3/12
USPC ............ 280/93.512, 93.513, 93.514, 93.515
See application file for complete search history.

(56) References Cited

U.S. PATENT DOCUMENTS

| | | | | |
|---|---|---|---|---|
| 4,314,710 A * | 2/1982 | Kamoshita | ............... | B62D 3/12 280/93.515 |
| 6,102,416 A * | 8/2000 | Harkrader | ................ | B62D 3/12 280/771 |
| 7,290,778 B2 * | 11/2007 | Domin | ................... | B62D 21/11 280/785 |
| 8,678,405 B2 * | 3/2014 | Tashiro | .................. | B62D 7/228 280/89.1 |
| 2004/0232642 A1* | 11/2004 | Bowling | ................ | B62D 3/126 280/93.515 |
| 2005/0104314 A1* | 5/2005 | Maruyama | ............ | F16F 1/3835 280/93.515 |

(Continued)

FOREIGN PATENT DOCUMENTS

| | | |
|---|---|---|
| DE | 102012011601 A1 | 12/2013 |
| JP | 2010-274835 A | 12/2010 |
| JP | 2011-225031 A | 11/2011 |

OTHER PUBLICATIONS

Machine translation of German Examination Report dated Mar. 25, 2015 for German Application No. 102014217317.5.

*Primary Examiner* — Toan C To
(74) *Attorney, Agent, or Firm* — Jones Robb, PLLC; Raymond Coppiellie (57) ABSTRACT

A securing arrangement for a steering gear housing is provided. The securing arrangement includes at least one steering gear securing portion formed on the steering gear housing and at least one bodywork securing portion formed on a bodywork component of a vehicle. Each steering gear securing portion has a steering gear bearing surface and each bodywork securing portion has a bodywork bearing surface configured to support a respective steering gear bearing surface so as to form a respective pair of bearing surfaces when the steering gear housing is arranged on the bodywork component. Each pair of bearing surfaces includes a convex bearing surface and a substantially planar bearing surface.

22 Claims, 3 Drawing Sheets

(56) References Cited

U.S. PATENT DOCUMENTS

| | | | |
|---|---|---|---|
| 2006/0108760 A1* | 5/2006 | Vandaele | B62D 5/22 280/93.515 |
| 2009/0250894 A1* | 10/2009 | Kojima | B62D 3/12 280/93.515 |
| 2010/0171281 A1* | 7/2010 | Rey | B62D 3/12 280/93.515 |
| 2010/0231005 A1* | 9/2010 | Yoshida | B62D 3/12 296/203.02 |

* cited by examiner

SECURING ARRANGEMENT FOR A STEERING GEAR HOUSING

CROSS REFERENCE TO RELATED APPLICATIONS

This application claims priority to German Application No. 10 2014 217 317.5, filed on Aug. 29, 2014, the entire content of which is incorporated by reference herein.

TECHNICAL FIELD

The present disclosure relates generally to a mounting arrangement for a steering gear housing to a body part of a vehicle, such as a vehicle body, a vehicle structure, frame or subframe, or an auxiliary frame of a vehicle, such as a motor vehicle, and a method for securing a steering gear housing to a body part of a vehicle.

BACKGROUND

Conventional electrical power steering systems for use in passenger cars and small trucks use belt-driven recirculating ball nuts to convert rotational movement of the electric motor to linear movement of the rack bar. Those recirculating ball nuts are sensitive to distortion and angular displacement of the rack relative to the ball nut, which results in increased friction and hence, a feeling of "sticky" steering and reduced efficiency of the electric power steering system. In order to avoid this distortion, the contact surfaces on the gear housing and the vehicle frame it is mounted to, are precisely machined, which is an undesired, expensive manufacturing operation on the frame and on the steering gear housing. In some designs, it is not possible to position all mountings on one casting of the gear housing, so a certain inaccuracy remains even after machining and leads to the "sticky" steering feel. In some other cases, the subassembly of steering gear and frame is distorted when being assembled to the vehicle because of vehicle body tolerances, placing the housing under stress/tension.

However, a steering gear housing which is under stress during operation may have a negative effect on the steering sensation which is perceived by a driver of the vehicle, in particular, for example, in the case of electro-mechanical steering systems in which an electric motor is in operational engagement by means of a ball screw with the toothed rod of the steering system since ball screws can react in a particularly sensitive manner to mechanical distortions.

Against this background, an object of the present disclosure is to provide a mounting arrangement for a steering gear housing and a vehicle in which stress-free or substantially stress-free securing of the steering gear housing to a bodywork component of the vehicle is possible, so that there are no negative effects on the steering sensation perceived by a driver of the vehicle from a steering gear which is secured to the bodywork component of the vehicle. In addition, the mounting arrangement is intended to ensure a secure and fixed arrangement of the steering gear housing to the bodywork component of the vehicle.

SUMMARY

In accordance with various exemplary embodiments, the present disclosure provides a securing arrangement for a steering gear housing. The securing arrangement comprises at least one steering gear securing portion formed on the steering gear housing. Each of the at least one steering gear securing portions has a steering gear bearing surface. At least one bodywork securing portion is formed on a bodywork component of a vehicle. Each of the at least one bodywork securing portions has a bodywork bearing surface configured to support a respective steering gear bearing surface so as to form a respective pair of bearing surfaces when the steering gear housing is arranged on the bodywork component. Each pair of bearing surfaces includes a convex bearing surface and a substantially planar bearing surface.

In accordance with various exemplary embodiments, the present disclosure also provides a vehicle. The vehicle comprises a steering gear housing and a bodywork component to which the steering gear housing is secured. The steering gear housing is secured to the bodywork component with at least one securing arrangement which comprises at least one steering gear securing portion formed on the steering gear housing. Each of the at least one steering gear securing portions has a steering gear bearing surface. At least one bodywork securing portion is formed on the bodywork component of a vehicle. Each of the at least one bodywork securing portions has a bodywork bearing surface configured to support a respective steering gear bearing surface so as to form a respective pair of bearing surfaces when the steering gear housing is arranged on the bodywork component. Each pair of bearing surfaces includes a convex bearing surface and a substantially planar bearing surface.

In accordance with various exemplary embodiments, the present disclosure provides a method for securing a steering gear housing to a bodywork component of a vehicle. The method comprises positioning a steering gear bearing surface in contact with a bodywork component bearing surface, temporarily securing the steering gear bearing surface to the bodywork component bearing surface, completely securing the bodywork component to a vehicle structure of the vehicle, and completely securing the steering gear housing to the bodywork component of the vehicle via the steering gear bearing surface to the bodywork component bearing surface.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

In the different figures, components which are equivalent in terms of their function are always provided with the same reference numerals so that they are generally also described only once.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

As used herein, the term "bodywork component" encompasses vehicle frames, sub-frames, auxiliary frames, and other vehicle body components—any portion of the vehicle to which the steering gear housing may be mounted or secured. These terms may be used interchangeably throughout the specification. In addition, the terms "securing arrangement" and "mounting arrangement" may be used interchangeably herein to refer to arrangement which permits the steering gear housing to be mounted to the vehicle body.

In accordance with the present teachings, a cost-efficient design and an improved assembly process for mounting steering gears to vehicle frames, which can be introduced independently of each other, is provided. In accordance with one aspect of the present disclosure, surfaces of the steering gear mounting bosses or the contact surface on the frame/body component has a convex shape, which matches to a flat shape surface of the other mating component. In one exemplary embodiment, the frame contact may comprise raw steel bushes which are welded into the frame and have nearly flat surfaces (substantially planar surfaces) as a result of cutting the bushes out of a steel pipe. In this case, the contact surface of each of the steering gear mounting bosses is a convex surface, which allows for compensation of angle and/or height differences between the different contact points. In one exemplary embodiment, the steering gear and the frame are in contact in three (3) points to provide a static bounded system without over constraining the system. Alternatively, the steering gear contact surfaces can be flat (planar) areas and the frame can provide the convex contact surfaces. In accordance with another exemplary embodiment, both the steering gear contact surfaces and the frame mounting surfaces can be convex.

In accordance with another aspect of the present disclosure, an assembly process for mounting the steering gear housing to the framework/body component of the vehicle is provided. The steering gear may be preassembled to the frame with a low clamping force which (torque controlled) ensures that all contact points between the steering gear and frame are in contact before final assembly of the frame to the vehicle body. During final assembly of the frame to the vehicle body, the frame may distort due to manufacturing tolerances of the frame and/or the vehicle body but the gently fixed steering gear is able to find its final position at this point in time without being stressed or tensioned. After fixation of the frame the screws for fixation of the steering gear will be fixed finally in an angle-controlled process which provides state of the art screwing technology and perfect process capability because both steps of the screwing process are divided between two separate assembly stations.

In accordance with the present disclosure, a securing or mounting arrangement for a steering gear housing comprises at least one steering-gear-side securing portion which is formed on the steering gear housing for positioning of the steering gear housing on a frame/body-component-side securing portion which is formed on a frame or body component of a vehicle, in particular a motor vehicle. The steering-gear-side securing portion has a steering-gear-side abutment face and the body-component-side securing portion has a body-component-side abutment face which is in abutment with the steering-gear-side abutment face when the steering gear housing is arranged on the frame/body component of the vehicle. According to the present teachings, one of the abutment faces is constructed in a spherical, that is to say convex, manner. In contrast to two planar abutment faces of the steering-gear-side and bodywork-side securing portions, as is conventional, the securing arrangement according to the present teachings produces, after a resilient/plastic deformation as a result of the assembly pre-tensioning force, a significantly smaller geometrical moment of inertia in the connection of the steering gear housing to the frame/body component of the vehicle. The securing arrangement therefore behaves in a significantly more flexurally resilient manner than a conventional securing arrangement. A steering gear housing distortion, for example, as a result of angular errors or errors in evenness in the abutment face or generally, as a result of component tolerances as described above, is consequently significantly reduced. Since the steering gear housing, after it has been assembled on the frame/body component of the vehicle, is subjected to little or substantially no housing distortion, there are also no negative effects therefrom on the steering sensation perceived by a driver of the vehicle.

According to the present disclosure, the steering-gear-side securing portion is constructed as a support foot which is connected to the steering gear housing, for example, a housing element which protrudes radially outwards from the outer contour of the steering gear housing, and which comprises the steering-gear-side abutment face. The support foot may be constructed integrally with the steering gear housing so that it can be constructed directly thereon during a casting operation for the steering gear housing. Furthermore, the frame/body-component-side securing portion may be constructed as a sleeve which is connected to the frame/body component and whose axial end face, facing the steering-gear-side abutment face, forms the frame/body-component-side abutment face. If the steering-gear-side abutment face of the support foot is constructed in a spherical manner, the planar body-component-side abutment face, that is to say, the axial end face of the sleeve, can be formed directly by the production process of the sleeve. The sleeve and axial end face (abutment face) may be produced, for example, by cutting from a long steel pipe or by rolling a metal sheet. The production costs for the securing arrangement thus can also be considerably reduced. In addition, this construction ensures a secure and fixed arrangement of the steering gear housing on the frame/body component of the vehicle.

Since the sleeve is already connected to the bodywork component, for example in a materially integral manner by means of welding, for example, the steering gear housing can be secured to the bodywork component in a single assembly step by the support foot being secured by means of a securing means which extends through the sleeve, for example, by a screw. The assembly complexity can thus be further reduced. The securing of the screw to the support foot may, for example, be carried out by providing in the support foot a through-hole through which the screw is guided and secured by means of a nut (screw/nut connection).

The bodywork component, for example, an auxiliary frame which can be connected to a vehicle structure of the vehicle may be constructed as a dual-shell sheet metal structure. The dual metal structure comprises, at least in the region of the bodywork-side securing portions of the steering gear housing and the bodywork component, a first metal sheet and a second metal sheet, which is arranged opposite the first metal sheet with a specific spacing. The sleeve may be inserted between the first and second metal sheets and connected thereto in such a manner that the spacing between the metal sheets is ensured while enabling the securing of the sleeve and, consequently, the bodywork-side securing portion to the steering-gear-side securing portion using a securing means or a securing element such as, for example, a screw.

In one exemplary embodiment of the present disclosure, only the steering-gear-side abutment face is constructed in a spherical manner. That is to say, only the steering-gear-side abutment faces (bearing surfaces) have a convex shape. This has the advantage that the spherical steering-gear-side abutment face can be constructed directly on the steering gear housing during a conventional casting operation for the steering gear housing. The production costs for the securing arrangement can thereby be reduced considerably.

Alternatively, in an exemplary embodiment of the present disclosure, only the bodywork-component-side abutment face(s) (bearing surface(s)) may have a convex shape.

In yet another exemplary embodiment, both the steering-gear-side abutment faces and the bodywork-component-side abutment faces may have convex and planar shapes. In such an embodiment, each of the steering-gear-side abutment faces is paired with a corresponding bodywork-component-side abutment faces during assembly, and each pair comprises one convex bearing surface and one planar bearing surface. For example, the steering gear housing may comprise two convex bearing surfaces and one planar bearing surface and the bodywork component may comprise two planar bearing surfaces and one convex bearing surface, wherein each convex bearing surface is paired with an opposing planar bearing surface during assembly of the steering gear housing to the frame.

In another exemplary embodiment of the present disclosure, the securing means or the screw is secured via an outer thread thereof which engages an inner thread formed in the support foot. Consequently, the screw can be secured directly to the support foot. Therefore, additional assembly steps, such as, for example, resisting and/or tightening a screw nut in a screw/nut connection, can be dispensed with. Accordingly, only a one-sided tool access to the head of the screw is required in order to secure the steering gear housing completely to the frame/bodywork component of the vehicle, thus further simplifying the assembly.

In accordance with another aspect of the present disclosure, a vehicle, in particular a motor vehicle, is provided and has a steering gear housing and a bodywork component, for example, a vehicle structure or an auxiliary frame which can be connected thereto and to which the steering gear housing can be secured. The steering gear housing is secured to the bodywork component with at least one securing arrangement as described in one of the previous embodiments.

In one exemplary embodiment, the vehicle may have precisely three securing arrangements (or mounting arrangements) for securing the steering gear housing to the bodywork component of the vehicle. There is provided a statically determined connection between the steering gear housing and the bodywork component of the vehicle, in which all six degrees of freedom of the steering gear housing are fixed in space, but the connection between the steering gear housing and the bodywork component of the vehicle is not statically overdetermined.

According to another aspect of the present disclosure, a method for securing a steering gear housing to a bodywork component of a vehicle, in particular a motor vehicle, is provided and uses at least one securing arrangement in accordance with the present teachings. The method comprises the steps of: providing a steering gear housing, providing a bodywork component which can be secured to a vehicle structure of the vehicle and to which the steering gear housing can be secured, temporarily securing the steering gear housing to the bodywork component of the vehicle in such a manner that the steering-gear-side securing portion touches the bodywork-side securing portion, then completely securing the bodywork component to the vehicle structure of the vehicle and finally completely securing the steering gear housing to the bodywork component of the vehicle.

In this manner, the steering gear housing is secured in a first assembly step with a small assembly pre-tensioning to the bodywork component, for example to the auxiliary frame which can be connected to a structure of the vehicle. This assembly step simply ensures that the abutment faces of the securing arrangement touch each other. Subsequently, the bodywork component is secured to the vehicle structure completely, that is to say, with the definitive assembly pre-tensioning. In this instance, slight distortion of the bodywork component may occur as a result of component tolerances on the bodywork component and/or the vehicle structure. However, since the steering gear housing up to this point is connected to the bodywork component only temporarily, that is to say, loosely or lightly or with a small assembly pre-tensioning, it can now assume its definitive position on the bodywork component in a stress-free manner. Only after the bodywork component is definitively and completely secured to the vehicle structure is, in the final assembly step, the steering gear housing also secured to the bodywork component completely, that is to say, with the definitive assembly pre-tensioning. In this manner, stress-free fitting of the steering gear housing to the bodywork component and to the vehicle structure of the vehicle is ensured.

In one exemplary embodiment of the method, the at least one securing arrangement comprises a screw for securing the steering-gear-side securing portion to the bodywork-side securing portion, the temporary securing of the steering gear housing to the bodywork component of the vehicle being carried out by means of torque-controlled tightening of the screw and the complete securing of the steering gear housing to the bodywork component of the vehicle being carried out by means of rotational-angle-controlled tightening of the screw.

Figure 1A:
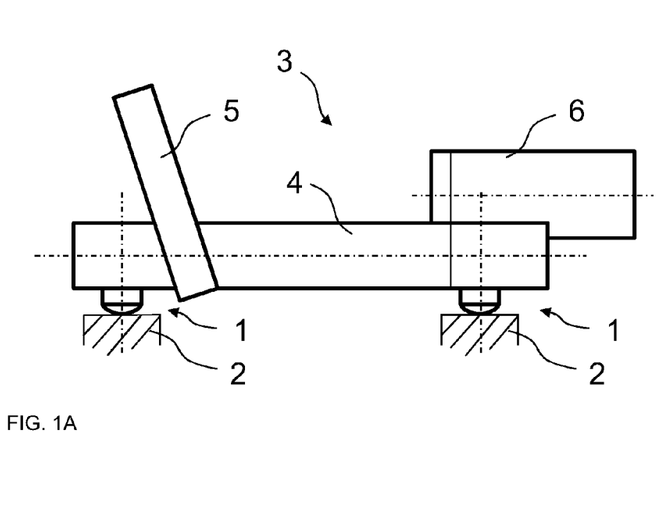
FIGS. 1A-1C are a side view, a front view, and a plan view, respectively, of a steering gear housing which is arranged on a frame or body component of a vehicle by means of three mounting arrangements in accordance with the present teachings.
Figure 1B:
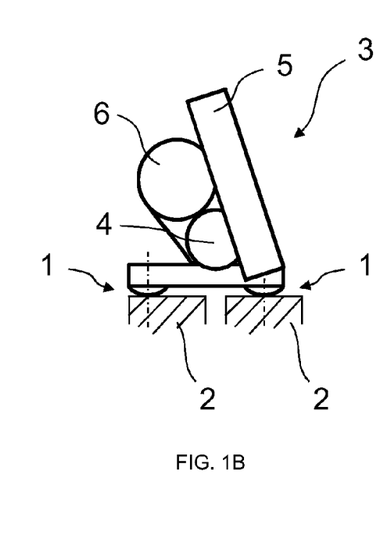
Figure 1C:
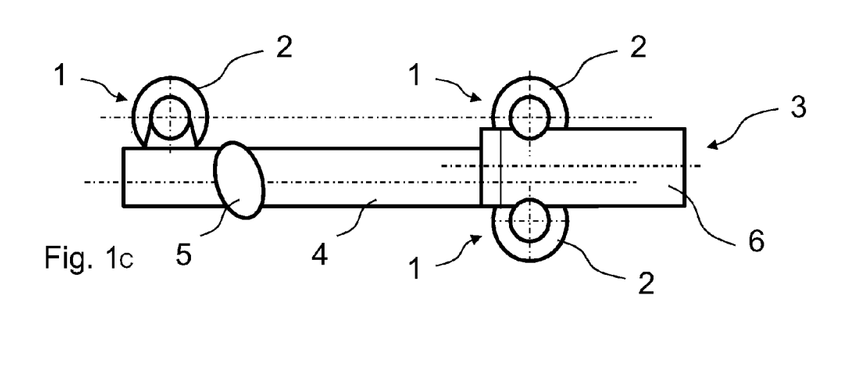

Turning now to the drawings, FIGS. 1A-1C are a side view, a front view, and a plan view of a steering gear housing 3, which is arranged by means of three identical securing arrangements (mounting arrangements) 1 on a bodywork component 2 of a vehicle. The steering gear housing 3 illustrated in FIGS. 1A-1C comprises a toothed rod housing portion 4, a pinion housing portion 5, and a servo housing portion 6. A toothed rod (not illustrated) of the steering system is substantially supported so as to be able to be axially displaced in known manner in the toothed rod housing portion 4. In the pinion housing portion 5, there is rotatably supported a pinion (also not illustrated) which is in operational engagement with the toothed rod by means of corresponding tooth arrangements on the pinion and on the toothed rod. The servo housing portion 6 receives a servo unit (not illustrated) of the steering system, for example an electric motor, which is positioned parallel with the toothed rod. In the embodiment illustrated, the electric motor is operationally connected to the toothed rod in a known manner by means of a ball screw. Since the construction and function of such steering systems, also referred to as REPAS (Rack Electric Power Assisted Steering), are generally known, these are not described further here.

Figure 2:
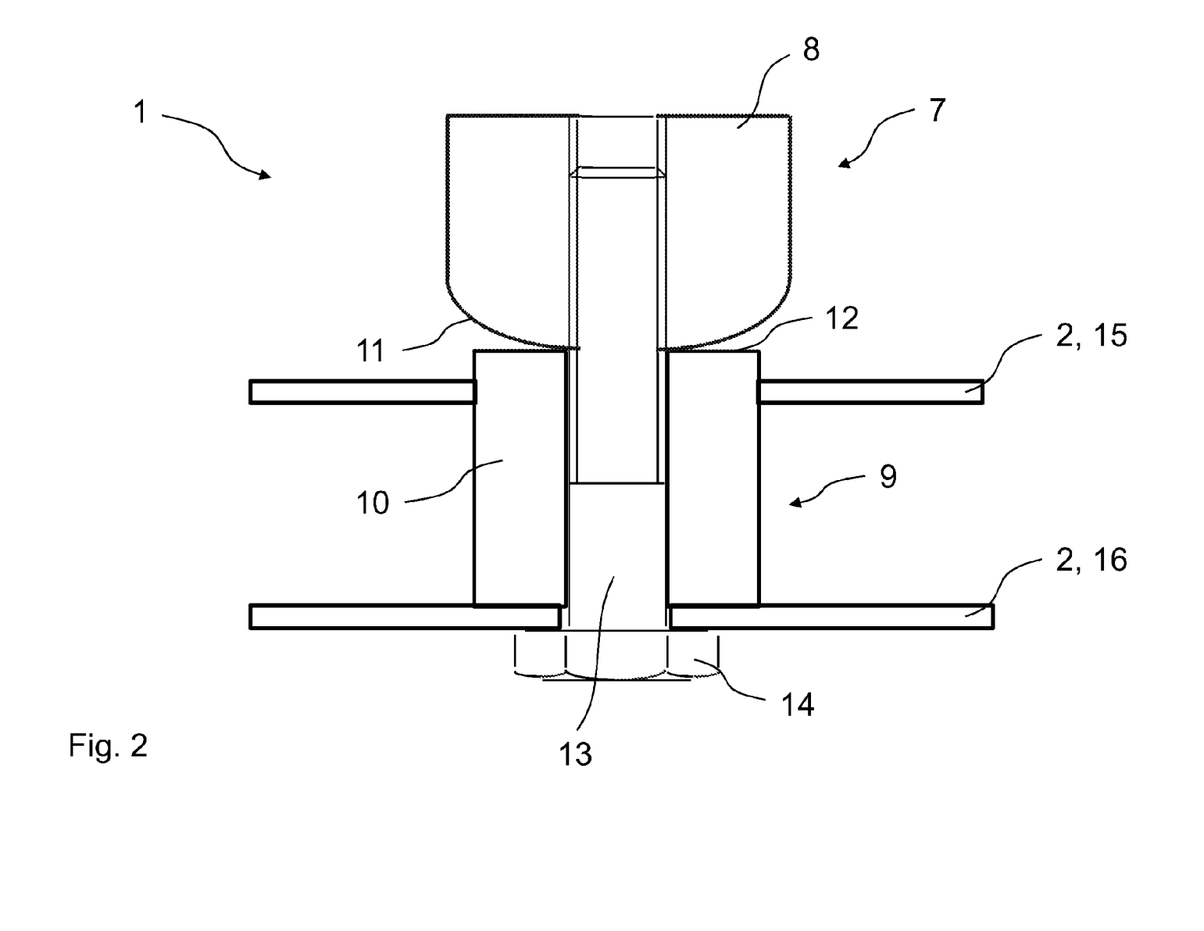
FIG. 2 is a lateral cross section of a mounting arrangement from FIG. 1.

FIG. 2 shows in detail a lateral cross-sectional view of one of the three securing arrangements 1 shown in FIGS. 1A-1C, the steering gear housing 3 in the state illustrated in FIG. 2, being arranged or secured on the bodywork component 2. As can further be seen in FIG. 2, the illustrated embodiment of the securing arrangement 1 comprises a steering-gear-side securing portion 7, which is constructed on the steering gear housing 3. Steering-gear-side securing portion 7 is constructed as a support foot 8 which is connected to the steering gear housing 3. In the embodiment of the securing arrangement 1 shown in FIG. 2, the support foot 8 is a housing element which protrudes radially outwards from the outer contour of the steering gear housing 3 and which can be constructed at the same time as the housing with a casting operation, thus producing the steering gear housing 3 with the support foot formed integrally thereon.

Furthermore, the securing arrangement 1 illustrated in FIG. 2 comprises a bodywork-side securing portion 9, which is constructed on the bodywork component 2 of the vehicle. Bodywork-side securing portion 9 is constructed as a sleeve 10 and is connected to the bodywork component 2. The sleeve 10 may be, for example, a steel sleeve which can be cut from a steel pipe. However, sleeve 10 may also, for example, be rolled from a metal sheet and then welded together.

As also shown in FIG. 2, the steering-gear-side securing portion 7 or the support foot 8 has a steering-gear-side abutment face (bearing surface) 11. The bodywork-side securing portion 9 or the sleeve 10 has a bodywork-side abutment face (bearing surface) 12. In the assembled state of the securing arrangement 1, as illustrated in FIG. 2, the bodywork-side abutment face 12 is in contact with the steering-gear-side abutment face 11. The bodywork-side abutment face 12 is formed by the axial end face of the sleeve 10 which faces the steering-gear-side abutment face 11. As can be seen in FIGS. 1A-1C and 2, in the embodiment of the securing arrangement 1 illustrated, the steering-gear-side abutment face 11 is constructed in a spherical, that is to say convex, manner, whereas the bodywork-side abutment face 12 is constructed in a planar manner. The steering-gear-side abutment face 11 is accordingly curved outwards in the direction of the bodywork-side planar abutment face 12 opposite it.

It should be noted that it is possible that the steering-gear-side abutment face 11 can be constructed in a planar manner and the bodywork-side abutment face 12 can be constructed in a spherical, or convex, manner. Additionally, each securing arrangement 1 including the steering-gear-side abutment face 11 and the bodywork-side abutment face 12 comprises one convex bearing surface and one planar bearing surface. It is contemplated that the steering gear housing may include only convex bearing surfaces and that the bodywork component (frame) may include only planar bearing surfaces, and vice versa. However, it is also contemplated that each of the steering gear housing and the bodywork component (frame) have a mix of convex and planar bearing surfaces, arranged such that when the bearing surfaces of the steering gear housing are brought into abutment with the bearing surfaces of the bodywork component (frame), each securing arrangement (bearing surface pair) includes only one convex bearing surface and only one planar bearing surface. For example, the steering gear housing may have two convex bearing surfaces and one planar bearing surface and the bodywork component may have two planar bearing surfaces and one convex bearing surface, wherein each convex bearing surface is paired with an opposing planar bearing surface during assembly of the steering gear housing to the bodywork component.

In FIG. 2, it can further be seen that the sleeve 10 is secured to the support foot 8 by means of a screw 13, which acts as a securing means. In the securing arrangement 1 illustrated in FIG. 2, the screw 13 has an outer thread which is screwed into an inner thread formed in the support foot 8. Consequently, in order to secure the screw 13 to the support foot 8, no nut is required, as with a screw/nut connection, so that, in order to secure the steering gear housing 3 to the bodywork component 2 of the vehicle, only one tool access to the head 14 of the screw 13 is required.

As further illustrated in FIG. 2, the bodywork component 2, which in the securing arrangement 1 shown, is an auxiliary frame which can be connected to a vehicle structure of the vehicle, is constructed at least in the region of the steering-gear-side and bodywork-side securing portions 7, 9 as a dual-shell sheet metal structure. The dual-shell sheet metal structure comprises a first upper metal sheet 15 (upper metal sheet) and a second lower metal sheet 16 (lower shell) which is arranged opposite the first upper metal sheet 15 with specific spacing. The sleeve 10 is inserted between the first metal sheet 15 and the second metal sheet 16 and is connected, for example, by being welded thereto. The sleeve 10 consequently acts, on the one hand, as a spacing sleeve, which ensures the spacing between the two metal sheets 15 and 16 and, on the other hand, directly ensures the securing of the bodywork-side securing portion 9 or the sleeve 10 to the steering-gear-side securing portion 7 or the support foot 8 by means of the screw 13 which acts as a securing means.

In contrast to two planar abutment faces of the steering-gear-side and bodywork-side securing portions, as found in conventional arrangements, the securing arrangement 1 in accordance with the present teachings, after a resilient/plastic deformation as a result of the assembly pre-tensioning force produced by the screw 13, produces a significantly smaller geometrical moment of inertia in the connection of the steering gear housing 3 to the bodywork component 2 of the vehicle, that is to say, in the abutment faces 11 and 12 which are in abutment with each other. The securing arrangement 1, therefore, behaves in a more flexurally resilient manner than, for example, a conventional securing arrangement whose abutment faces are all constructed in a planar manner. A steering gear housing distortion is significantly reduced by preventing or reducing chances of, for example, angular errors or errors in terms of evenness in one or both abutment faces, in particular with angular errors of the bodywork-side abutment face 12, or generally as a result of component tolerances, for example, of the steering gear housing 3, of the bodywork component 2 and/or the vehicle structure. Since the steering gear housing 3, after it has been assembled on the bodywork component 2 of the vehicle, is subjected to no or substantially no housing distortion, there are also no negative effects on the steering sensation perceived by a driver of the vehicle.

Figure 3A:
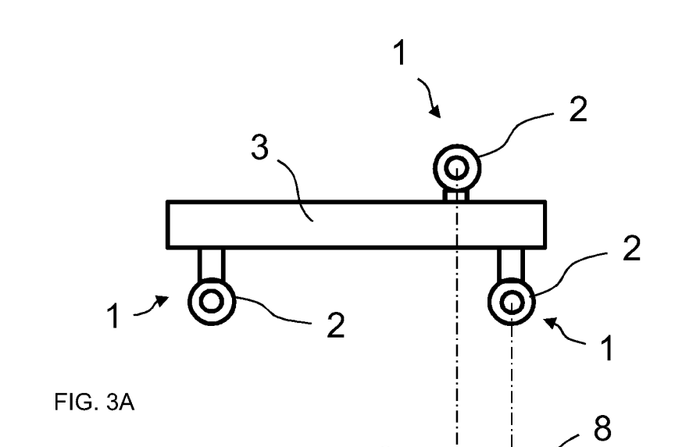
FIGS. 3A and 3B are a plan view and a side view, respectively, of a first assembly step for securing the steering gear housing from FIG. 1 to the frame or body component of the vehicle.
Figure 3B:
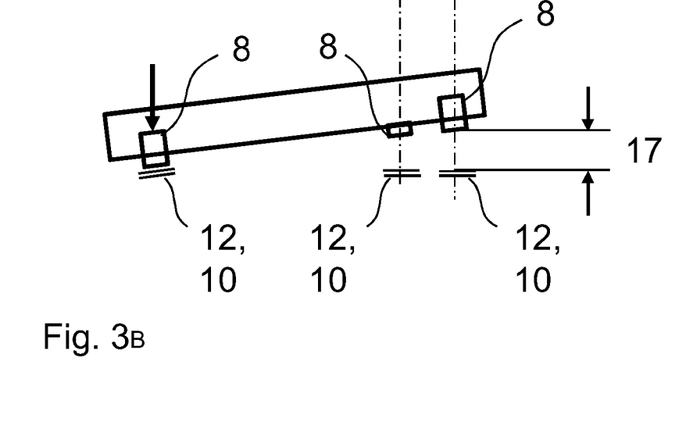
Figure 4A:
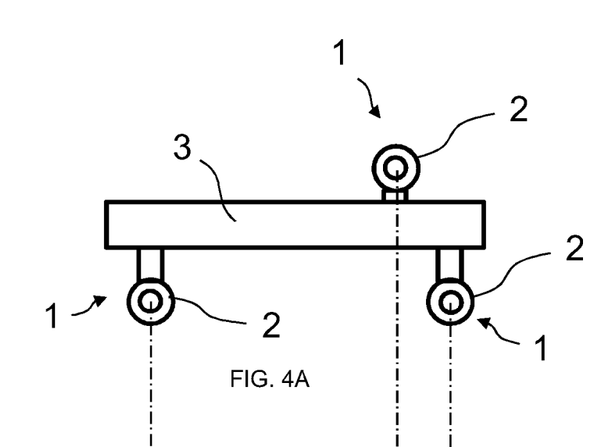
FIGS. 4A and 4B are a plan view and a side view, respectively, of a second assembly step for securing the steering gear housing from FIG. 1 to the frame or body component of the vehicle.
Figure 4B:
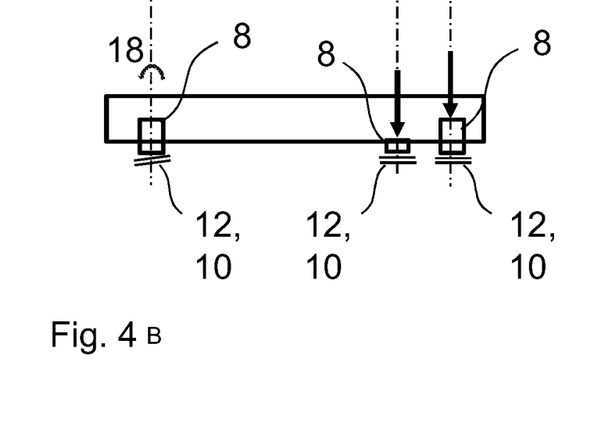

FIG. 3A is a plan view and FIG. 3B is a side view of a first assembly step for securing the steering gear housing 3 from FIG. 1 to the bodywork component 2 of the vehicle. In this first assembly step, the outermost left support foot 8 of the steering-gear-side securing portion 7 as illustrated in FIG. 3 was connected to the outermost left sleeve 10 of the bodywork-side securing portion 9. However, the abutment face 12 of this sleeve 10, which is formed by the end face of the sleeve 10 facing the support foot 8, has an angular error or error in terms of evenness. These may, for example, be produced by the fact that the sleeve 10 becomes distorted during welding, or originate from the production method of the sleeve 10, for example, from sawing the sleeve 10 from a steel pipe or rolling the sleeve 10. As a result of the angular error or error in terms of evenness of the abutment face 12, after the outermost left support foot 8 has been secured to the corresponding sleeve 10, a gap 17 is produced in the adjacent support feet 8 and sleeves 10 which are not yet secured to each other (in the illustration of FIG. 3, the two right securing portions which have not yet been brought into abutment). When these securing portions, during the further assembly of the steering gear housing 3 on the bodywork component 2 of the vehicle (second assembly step), are brought into forced abutment a bending torque 18 is produced in the outermost left steering-gear-side and bodywork-side securing portions of the securing arrangement 1, which portions are brought into engagement first. From this torque, inherent stresses result in the steering gear housing 3 again. FIGS. 4A and 4B are a plan view and a side view of this second assembly step for securing the steering gear housing 3 from FIG. 1 to the bodywork component 2 of the vehicle.

As already described above, the forced bending torques in the securing portions which have angular errors and unevenness errors are substantially reduced by the fact that at least one of the mutually adjacent abutment faces 11, 12 is constructed in a spherical manner. The reason for this is that, after a resilient/plastic deformation as a result of the assembly pre-tensioning force applied by the securing means, a significantly smaller geometrical moment of inertia is produced in the abutment faces 11 and 12 and the securing arrangement 1 consequently behaves in a more flexurally resilient manner than when both abutment faces 11 and 12 are each constructed in a planar manner as in conventional securing arrangements.

As a result of the higher flexural resilience of the securing arrangement according to the present disclosure, it is possible to dispense with strict compliance with the requirements for plane-parallelism of the steering-gear-side and the bodywork-side abutment faces. The previously required mechanical, cutting processing operation both of the steering-gear-side and the bodywork-side securing portions can consequently be dispensed with.

During the assembly of the steering gear housing 3 on the bodywork component 2 of the vehicle, the steering gear housing 3 is preferably first secured with a small assembly pre-tensioning to the bodywork component 2, for example, the auxiliary frame which can be connected to the vehicle structure of the vehicle. This merely ensures that the abutment faces 11 and 12 of the securing arrangement 1 touch each other. Subsequently, the bodywork component 2 is secured to the vehicle structure of the vehicle completely, that is to say, with the definitive assembly pre-tensioning. In this instance, as a result of component tolerances in the bodywork component 2 and/or in the vehicle structure, slight distortion of the bodywork component 2 may occur. However, since the steering gear housing 3 is connected until this time to the bodywork component 2 only temporarily, that is to say, with a small assembly pre-tensioning, it can now assume its definitive position on the bodywork component 2 in a stress-free manner. Subsequently, the bodywork component is secured to the vehicle structure definitively and completely. Finally, the steering gear housing 3 is also secured to the bodywork component 2 completely, that is to say, with the definitive assembly pre-tensioning. In this manner, stress-free fitting of the steering gear housing 3 to the bodywork component 2 and to the vehicle structure of the vehicle is ensured.

The securing of the steering-gear-side securing portion to the bodywork-side securing portion may be carried out via use of a securing means or a securing element which may be constructed, for example, as a screw 13. Other suitable securing elements may be used, as will be apparent to those of ordinary skill in the art. In this instance, the temporary securing of the steering gear housing 3 to the bodywork component 2 of the vehicle may be carried out by torque-controlled tightening of the screw 13 and complete securing of the steering gear housing 3 to the bodywork component 2 of the vehicle by rotational-angle-controlled tightening of the screw 13.

The securing arrangement in accordance with the present disclosure, the vehicle in accordance with the present disclosure, and the securing method in accordance with the present disclosure have been explained in greater detail with reference to an embodiment illustrated in the drawings. The securing arrangement, the vehicle, and the securing method are not limited to the embodiment disclosed herein, but instead also comprise other embodiments which function in the same manner.

Thus, it is, for example, contemplated that the bodywork-side securing portion may receive a bushing, such as a steel bushing, for example, a bushing which is pressed into the sleeve and which is constructed at the end face thereof facing the steering-gear-side securing portion in a spherical manner and consequently forms a spherical bodywork-side abutment face. The steering-gear-side abutment face could in this instance be constructed in a planar manner. The reverse case is also contemplated, that is to say that a bushing may be received in a hole provided in the steering-gear-side securing portion, for example, in the steering-gear-side support foot. This bushing, such as a steel bushing, could be constructed at the end face thereof facing the bodywork-side securing portion in a spherical manner and have an inner thread in which the securing means, for example, a screw, could be screwed in order to secure the bodywork-side securing portion to the steering-gear-side securing portion. This has the advantage that the securing of the two securing portions, as a result of the steel bushing, with respect to directly securing the securing means to the steering gear housing, such as an aluminum die cast housing, involves a degree of resilience.

Furthermore, the bushing could also substantially be constructed as a rubber/metal bushing which is known, that is to say, the bushing may comprise an outer bushing, an inner bushing, and a resilient member which is arranged between the outer bushing and the inner bushing. In this instance, the outer bushing could be secured to the bodywork-side securing portion, for example, pressed into the sleeve which is connected to the bodywork-side securing portion, and the inner bushing could be constructed in a spherical manner at the end face facing the steering-gear-side securing portion or the steering-gear-side abutment face.

Of course, a transposed arrangement of the bushing or rubber/metal bushing with respect to the bodywork-side and steering-gear-side securing portion is also contemplated. That is to say, the bushing or rubber/metal bushing, instead of being connected to the bodywork-side securing portion, could be connected to the steering-gear-side securing portion, for example, be received or pressed in a hole provided in the steering-gear-side support foot and, as described above, be in abutment against the abutment face which is formed on the bodywork-side securing portion. In this instance, the end face of the bushing facing the bodywork-side abutment face or the inner bushing in a rubber/metal bushing could be constructed in a spherical manner.

The insertion of a bushing, such as a rubber/metal bushing, into the steering-gear-side or bodywork-side securing portion affords the advantage of noise or oscillation insulation of the steering gear housing with respect to the bodywork component of the vehicle.

In one exemplary embodiment, the securing arrangement may be used to support and secure a steering gear housing for a vehicle, in particular a motor vehicle, on a bodywork component of the vehicle.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more FIGS. represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A securing arrangement for a steering gear housing, comprising:
   at least one steering gear securing portion formed on the steering gear housing, each of the at least one steering gear securing portions having a steering gear bearing surface;
   at least one bodywork securing portion formed on a bodywork component of a vehicle, each of the at least one bodywork securing portions having a bodywork bearing surface configured to support a respective steering gear bearing surface so as to form a respective pair of bearing surfaces when the steering gear housing is arranged on the bodywork component;
   wherein each pair of bearing surfaces includes a convex bearing surface and a substantially planar bearing surface.

2. The securing arrangement as claimed in claim 1, wherein each steering gear bearing surface of each bearing surface pair has a convex shape.

3. The securing arrangement as claimed in claim 1, wherein each steering gear bearing surface of each bearing surface pair is substantially planar.

4. The securing arrangement as claimed in claim 1, wherein the at least one steering gear securing portion is constructed as a support foot formed integrally with the steering gear housing.

5. The securing arrangement as claimed in claim 4, wherein the at least one bodywork securing portion is constructed as a sleeve and is connected to the bodywork component.

6. The securing arrangement as claimed in claim 5, wherein an axial end face of the sleeve forms the bodywork bearing surface.

7. The securing arrangement as claimed in claim 5, wherein the sleeve is secured to the support foot by a fastening element.

8. The securing arrangement as claimed in claim 7, wherein the fastening element is a screw which has an outer thread and wherein the support foot includes an inner thread configured to engage the outer thread.

9. A vehicle comprising:
a steering gear housing;
a bodywork component to which the steering gear housing is secured, wherein the steering gear housing is secured to the bodywork component with at least one securing arrangement as claimed in claim 1.

10. The vehicle as claimed in claim 9, wherein the steering gear housing is secured to the bodywork component with three securing arrangements.

11. The vehicle as claimed in claim 10, wherein each steering gear bearing surface of each bearing surface pair has a convex shape.

12. The vehicle as claimed in claim 10, wherein each steering gear bearing surface of each bearing surface pair is substantially planar.

13. The vehicle as claimed in claim 10, wherein the steering gear housing includes two convex bearing surfaces and one substantially planar bearing surface.

14. A method for securing a steering gear housing to a bodywork component of a vehicle, comprising:
positioning a steering gear bearing surface in contact with a bodywork component bearing surface, wherein at least one of the bearing surfaces is convex;
temporarily securing the steering gear bearing surface to the bodywork component bearing surface;
completely securing the bodywork component to a vehicle structure of the vehicle; and
completely securing the steering gear housing to the bodywork component of the vehicle via the steering gear bearing surface to the bodywork component bearing surface.

15. The method as claimed in claim 14, wherein positioning a steering gear bearing surface in contact with a bodywork component bearing surface includes bringing the at least one convex bearing surface into contact with a planar bearing surface.

16. The method as claimed in claim 15, wherein each of the steering gear bearing surfaces has a convex shape.

17. The method as claimed in claim 14, wherein temporarily securing the steering gear bearing surface to the bodywork component bearing surface includes at least partially tightening a screw passing through the bearing faces.

18. The method as claimed in claim 17, wherein at least partially tightening the screw includes torque-controlled tightening of the screw.

19. The method as claimed in claim 18, wherein completely securing the steering gear housing to the bodywork component of the vehicle includes rotational-angle-controlled tightening of the screw.

20. A securing arrangement for a steering gear housing, comprising:
a plurality of bearing surface pairs, each pair comprising a steering gear bearing surface associated with the steering gear housing and a bodywork bearing surface associated with a bodywork component of a vehicle and configured to support the steering gear bearing surface,
wherein each bearing surface pair includes a convex bearing surface and a substantially planar bearing surface.

21. The securing arrangement of claim 20, wherein each steering gear bearing surface of each bearing surface pair has a convex shape.

22. The securing arrangement as claimed in claim 20, wherein each steering gear bearing surface of each bearing surface pair is substantially planar.

* * * * *